(12) United States Patent
Ooshima et al.

(10) Patent No.: US 7,413,680 B2
(45) Date of Patent: Aug. 19, 2008

(54) PHOSPHOR AND FLUORESCENT DISPLAY DEVICE

(75) Inventors: Hidenori Ooshima, Nagoya (JP); Fuyutoshi Sato, Nagoya (JP)

(73) Assignee: Noritake Co., Limited, Nagoya (JP)

( * ) Notice: Subject to any disclaimer, the term of this patent is extended or adjusted under 35 U.S.C. 154(b) by 329 days.

(21) Appl. No.: 11/390,058

(22) Filed: Mar. 28, 2006

(65) Prior Publication Data

US 2006/0219977 A1    Oct. 5, 2006

(30) Foreign Application Priority Data

Mar. 31, 2005    (JP)    ............................... 2005-100907

(51) Int. Cl.
     *C09K 11/67*    (2006.01)

(52) U.S. Cl. ............................... 252/301.4 F; 313/467; 313/486

(58) Field of Classification Search ........... 252/301.4 F; 313/467, 486
See application file for complete search history.

(56) References Cited

U.S. PATENT DOCUMENTS 5,619,098 A    4/1997    Toki et al.
6,669,868 B2 *    12/2003    Yu et al. ............... 252/301.4 F
6,673,269 B2    1/2004    Suzuki et al.

FOREIGN PATENT DOCUMENTS

| JP | A 8-85788 | 4/1996 |
|---|---|---|
| JP | A 2002-226850 | 8/2002 |
| JP | A 2003-41246 | 2/2003 |
| JP | A 2004-238549 | 8/2004 |
| JP | A 2005-8674 | 1/2005 |

OTHER PUBLICATIONS

Kang et al., "P-102: The Influence of Li Addition on Cathodoluminescence for $CaTiO_3:Pr^{3+}$," Europdisplay, pp. 777-779, 2002.
Diallo et al., "Improvement of the optical performances of $Pr^{3+}$ in $CaTiO_3$," Journal of Alloys and Compounds, 323-324, pp. 218-222, 2001.
Vecht et al., "New electron excited light emitting materials," J. Vac. Sci. Technol. B 12(2), pp. 781-784, 1994.

* cited by examiner

*Primary Examiner*—C. Melissa Koslow
(74) *Attorney, Agent, or Firm*—Oliff & Berridge, PLC

(57) ABSTRACT

A phosphor including a matrix in the form of titanate expressed by $Ca_{1-x}Sr_xTiO_3$ ($0<x\leqq0.5$), and Pr (praseodymium) and Li (lithium) that are added to the matrix. The phosphor may further include Zn (zinc) that is added as well as the Pr and Li to the matrix. Also disposed is a process of manufacturing the phosphor, including: a mixing step of mixing a matrix material, a first additive material including Pr, and a second additive material including Li, so as to obtain a mixture; and a firing step of firing the obtained mixture at a firing temperature of from 1050 to 1250° C.

12 Claims, 5 Drawing Sheets

PHOSPHOR AND FLUORESCENT DISPLAY DEVICE

This application is based on Japanese Patent Application No. 2005-100907 filed on Mar. 31, 2005, the content of which is incorporated hereinto by reference.

BACKGROUND OF THE INVENTION

1. Field of the Invention

The present invention relates in general to a phosphor and also a fluorescent display device equipped with the phosphor as a light emitting source.

2. Discussion of Related Art

Conventionally, there has been used a $Zn_{1-x}Cd_xS$ based phosphor (hereinafter referred to as ZnCdS based phosphor) as a phosphor that is to be excited by a low-velocity electron beam used in a fluorescent display device such as VFD (Vacuum Fluorescent Display), to emit a red luminous color. In recent years, use of toxic element such as Cd (cadmium) is restricted in view of environmental issue, and ZnCdS based phosphor is also subjected to such a restriction. Further, another problem is that, where ZnCdS based phosphor as sulfide is decomposed by irradiation of an electron beam thereto, an electron emission capacity of oxide cathode serving as an electron source is reduced by S (sulfur) scattering from the ZnCdS based phosphor. In the present specification, the term "low-velocity electron beam" is interpreted to mean an electron beam accelerated by an electric voltage of 10-100 (V) suitable for the VFD, unless otherwise specified.

On the other hand, there is proposed, as an oxide based phosphor which does not include Cd and S and which is exited by a low-velocity electron beam to emit a red luminous color, a phosphor including a matrix constituted by an alkaline earth metal and an oxide of Ti (titanium), and an rare earth element and a group III element that are added to the matrix. The alkaline earth metal may be, for example, Mg, Sr, Ca or Ba. The rare earth element may be, for example, Ce, Pr, Eu, Tb, Er or Tm. The group III element may be, for example, Al, Ga, In or Tl. As a typical example of the composition, there is $SrTiO_3$:Pr,Al as disclosed in patent documents 1 and 2 that are identified below. The elements Pr, Al given on a right side of ":" are components added to $SrTiO_3$. In this composition, a preferable amount of Pr is from 0.1 to 2 (mol %), while a preferable amount of Al is from 1 to 50 (mol %) (see the patent document 1).

In addition, although not being used for the VFD, there is proposed $CaTiO_3$ based phosphor as another example of the composition in which the alkaline earth metal is Ca, as disclosed in non-patent documents 1-3 that are identified below. In the non-patent documents 1-3, there are disclosed, for example, $CaTiO_3$:Pr excited by an electron beam accelerated by an electric voltage of 700 (V) or higher, $CaTiO_3$:Pr,Al excited by an ultraviolet, and $CaTiO_3$:Pr, Li excited by an electron beam accelerated by an electric voltage of 1 (kV).

[Patent document 1]
JP-H08-85788A (publication of unexamined Japanese Patent Application laid open in 1996)

[Patent document 2]
JP-2003-41246A (publication of unexamined Japanese Patent Application laid open in 2003)

[Non-patent document 1]
Vecht et al. "New electron excited light emitting materials" J. Vac. Sci. Technol. B 12(2), March/April 1994 p. 781-784

[Non-patent document 2]
P. T. Diallo et al. "Improvement of the optical performances of Pr3+ in CaTiO3" Journal of Alloys and Compounds 323-324 (2001) p. 218-222

[Non-patent document 3]
Seung-Youl Kang et al. "The Influence of Li Addition on Cathodoluminescence for CaTiO3:Pr3+" EURODISPLAY 2002 p. 777-779

$SrTiO_3$:Pr,Al phosphor disclosed in the patent document 1 has a problem that its service life is short due to considerable deterioration of its brightness. The patent document 2 discloses a technique for restraining the deterioration of the brightness by covering a surface of each particle of the phosphor with a protective coating that is made of compound of the matrix. However, even with the application of such a technique thereto, the service life of $SrTiO_3$:Pr,Al phosphor is still considerably shorter than that of ZnCdS based phosphor. Further, the brightness of $SrTiO_3$:Pr,Al phosphor covered with the protective coating is lower even in its initial stage than that of ZnCdS based phosphor.

Regarding $CaTiO_3$ based phosphor disclosed in the non-patent documents 1-3, where it is excited by a low-velocity electron beam, its brightness is at most about one-tenth as high as that of ZnCdS based phosphor. Thus, $CaTiO_3$ based phosphor can not be used for the fluorescent display device such as VFD.

SUMMARY OF THE INVENTION

The present invention was made in the light of the background art discussed above. It is therefore a first object of the invention to provide an oxide-based phosphor having a service life longer than that of $SrTiO_3$:Pr,Al phosphor and capable of emitting a light with a high brightness even by excitation thereof with a low-velocity electron beam. It is a second object of the invention to provide a fluorescent display device including a light emitting source provided by such an oxide-based phosphor. It is a third object of the invention is to provide a process of manufacture such an oxide-based phosphor. The first object may be achieved according to any one of first through fourth aspects of the invention which are described below. The second object may be achieved according to a fifth aspect of the invention described below. The third object may be achieved according to any one of sixth through eighth aspects of the invention described below.

The first aspect of this invention provides a phosphor including: a matrix in the form of titanate expressed by $Ca_{1-x}Sr_xTiO_3$ ($0<x\leq0.5$); and Pr (praseodymium) and Li (lithium) that are added to the matrix.

The second aspect of this invention provides a phosphor including: a matrix in the form of titanate expressed by $Ca_{1-x}Sr_xTiO_3$ ($0<x\leq0.5$); and Pr (praseodymium), Li (lithium) and Zn (zinc) that are added to the matrix.

According to the third aspect of the invention, in the phosphor defined in the first or second aspect of the invention, the Pr is added in an amount of from 0.003 to 0.09 (mol %), per one (mol) of the matrix.

According to the fourth aspect of the invention, in the phosphor defined in any one of the first through third aspects of the invention, the Li is added in an amount of 3 (mol %) or less, per one (mol) of the matrix.

The fifth aspect of this invention provides a display device including a light emitting source that is provided by the phosphor defined in any one of the first through fourth aspects of the invention.

The sixth aspect of this invention provides a process of manufacturing the phosphor defined in the first, third and fourth aspects of the invention. The process includes a mixing step of mixing a matrix material forming the matrix, a first additive material including Pr, and a second additive material including Li, so as to obtain a mixture; and a firing step of firing the obtained mixture at a firing temperature of from 1050 to 1250° C., preferably of from 1050 to 1200° C., more preferably of from 1100 to 1150° C.

The seventh aspect of this invention provides a process of manufacturing the phosphor defined in the second, third and fourth aspects of the invention. The process includes a mixing step of mixing a matrix material forming the matrix, a first additive material including Pr, a second additive material including Li and a third additive material including Zn, so as to obtain a mixture; and a firing step of firing the obtained mixture at a firing temperature of from 1050 to 1250° C., preferably of from 1050 to 1200° C., more preferably of from 1100 to 1150° C.

According to the eighth aspect of the invention, the process defined in the sixth or seventh aspect of the invention further includes a preliminary firing step that is implemented before the firing step as a main firing step, to fire the obtained mixture at a preliminary firing temperature of from 800 to 1200° C., so as to obtain a preliminarily fired mixture, wherein the main firing step is implemented to fire the preliminarily fired mixture.

In the phosphor defined in any one of the first through fourth aspect of the invention, at least Pr and Li are added to the $Ca_{1-x}Sr_xTiO_3$ matrix in which a part of A site (Ca) of $CaTiO_3$ is substituted by Sr within a range of $0<x\leq0.5$. The thus constructed phosphor as an oxide-based phosphor has a service life longer than that of $SrTiO_3$:Pr,Al phosphor and is capable of emitting a light with a high brightness even by excitation thereof with a low-velocity electron beam, although the reason has not yet been revealed. That is, while a conventional $CaTiO_3$ based phosphor cannot exhibit a high brightness without exciting by a high-velocity electron beam or an ultraviolet, the present phosphor is capable of exhibiting a high brightness even by excitation thereof with a low-velocity electron beam and is less easily deteriorated than the $SrTiO_3$:Pr,Al phosphor, owing to the construction in which the part of Ca is substituted by Sr and at least Pr and Li are added to the $Ca_{1-x}Sr_xTiO_3$ matrix.

In the phosphor defined in the second aspect of the invention in which Zu as well as Pr and Li is doped in the matrix, a still higher brightness can be obtained.

In the present specification, the term "$Ca_{1-x}Sr_xTiO_3$" is interpreted to mean not only one having a stoichiometric composition in which a ratio of (Ca+Sr)/Ti is one, but also one having a stoichiometric composition in which the ratio of (Ca+Sr)/Ti is slightly higher or lower than one. For example, the ratio of (Ca+Sr)/Ti may range from 1.05 to 0.95.

Further, an amount of each of Pr, Li and Zn that is to be added to the matrix may be within a usual range of an amount by which an activator is added and is not particularly limited as long as a function of the phosphor is maintained, namely, as long as the phosphor can emit a light by excitation thereof with a low-velocity electron beam.

In the phosphor defined in the third aspect of the invention in which Pr is added in an amount of from 0.003 to 0.09 (mol %) per one (mol) of the matrix, it is possible to obtain a still higher brightness which is, for example, at least twice as high as that obtained in a conventional phosphor in which Pr is added in an amount of 0.1 (mol %). Where the added amount of Pr is smaller than 0.003 (mol %) or larger than 0.09 (mol %), the brightness exhibited by excitation with a low-velocity electron beam is made considerably lower than that exhibited in a conventional sulfide-based phosphor, although the brightness could be high by excitation with an ultraviolet or a high-velocity electron beam that is accelerated by a voltage of 1 (kV) or higher.

Where a concentration of Pr is too high, the brightness is reduced due to a so-called "concentration quenching". Thus, the brightness is increased by lowering the concentration of Pr. However, where the concentration of Pr is too lowered, the brightness is reduced due to reduction of number of luminescent centers. It is considered that, in the phosphor of the present invention, an appropriate range of the concentration of Pr which provides a sufficient number of the luminescent centers and which avoids the concentration quenching ranges from 0.003 to 0.09 (mol %).

In the phosphor defined in the fourth aspect of the invention in which Li is added in an amount of 3 (mol %) or less per one (moD of the matrix, the amount of Li serving as a flux component is made sufficiently small whereby a degree of sintering of the phosphor can be kept sufficiently low, thereby facilitating production of powders.

The phosphor constructed according to the invention is capable of exhibiting a high brightness by excitation even with a low-velocity electron beam used in VFD. However, since the phosphor of the invention is operable to emit a light by excitation also with an ultraviolet or a high-velocity electron beam accelerated by a voltage of 1 (kV) or higher, it can be used not only in case of excitation with a low-velocity electron beam. That is, the invention is applicable not only to a fluorescent display device but also to a field emission display (FED) in which the phosphor is operated to emit a light by excitation with an electron beam generated by an electric voltage of from about 1 to 10 (kV), a cathode ray tube (CRT) in which the phosphor is operated to emit a light by excitation with an electron beam generated by an electric voltage of about 10 (kV), and a plasma display device (PDP) in which the phosphor is operated to emit a light by excitation with an ultraviolet.

The display device defined in the fifth aspect of the invention, owing to the light emitting source provided by the phosphor defined in any one of the first through fourth aspects of the invention, is operable by an electric power with a low voltage to exhibit a high brightness with a long service life. It is noted that the display device is not necessarily a fluorescent display device but may be any other display device, such as a field emission display, a cathode ray tube and a plasma display device, which has the phosphor serving as the light emitting source.

In the phosphor manufacturing process defined in either of the sixth and seventh aspects of the invention, the mixing step is implemented to mix the matrix material, the first additive material, the second additive material and additionally the third additive material, and the firing step is then implemented to fire the mixture at the temperature of from 1050 to 1250 (° C.). This process enables the manufactured phosphor to have a long service life and to emit a light with a high brightness even by excitation thereof with a low-velocity electron beam. Where the mixture is fired at a relatively low temperature such as the temperature ranging from 1050 to 1250 (° C.), the manufactured phosphor exhibits a high brightness (e.g., 150 (cd/m$^2$) or more), even by excitation thereof with a low-velocity electron beam, which is at least six times as high as a brightness exhibited by a conventional $Ca_{1-x}Sr_xTiO_3$:Pr,M phosphor that is manufactured with a high firing temperature such as about 1300 (° C.), and is less easily deteriorated than the $SrTiO_3$:Pr,Al phosphor. It is noted that the firing step may be implemented either under an oxide atmosphere (i.e., in a standard atmosphere) or under a neutral atmosphere (e.g., nitrogen or argon).

In the phosphor manufacturing process defined in the eighth aspect of the invention in which the preliminary firing step is implemented prior to the main firing step, the additive elements such as Pr, Li and Zn can be further evenly dispersed into an entirety of the $Ca_{1-x}Sr_xTiO_3$ matrix. Therefore, the implementation of the preliminary firing step causes the brightness to be higher by about 20 (%) than where the phosphor is manufactured without the implementation of the preliminary firing step. That is, an uneven distribution of Pr, i.e., a lack of uniformity in the concentration of Pr is likely to cause reduction of the brightness not only in a portion of high concentration of Pr due to the concentration quenching but also in a portion of low concentration of Pr due to deficiency of the luminescent centers, thereby resulting in reduction of light emitting performance of the phosphor as a whole.

The phosphor manufacturing process defined in the eighth aspect of the invention may further include: a milling step that is implemented after the main firing step, to mill or divide the fired mixture into particles each having a suitable diameter such as 3 (μm); a washing and sieving step that is implemented to wash the particles obtained by the milling step and to sieve the particles for removing unreacted components therefrom, a drying step of dying separated components by removing a water content from the separated components; and a crushing step of crushing an aggregation of solids obtained by the drying step.

BRIEF DESCRIPTION OF THE DRAWINGS

The above and other objects, features, advantages and technical and industrial significance of this invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
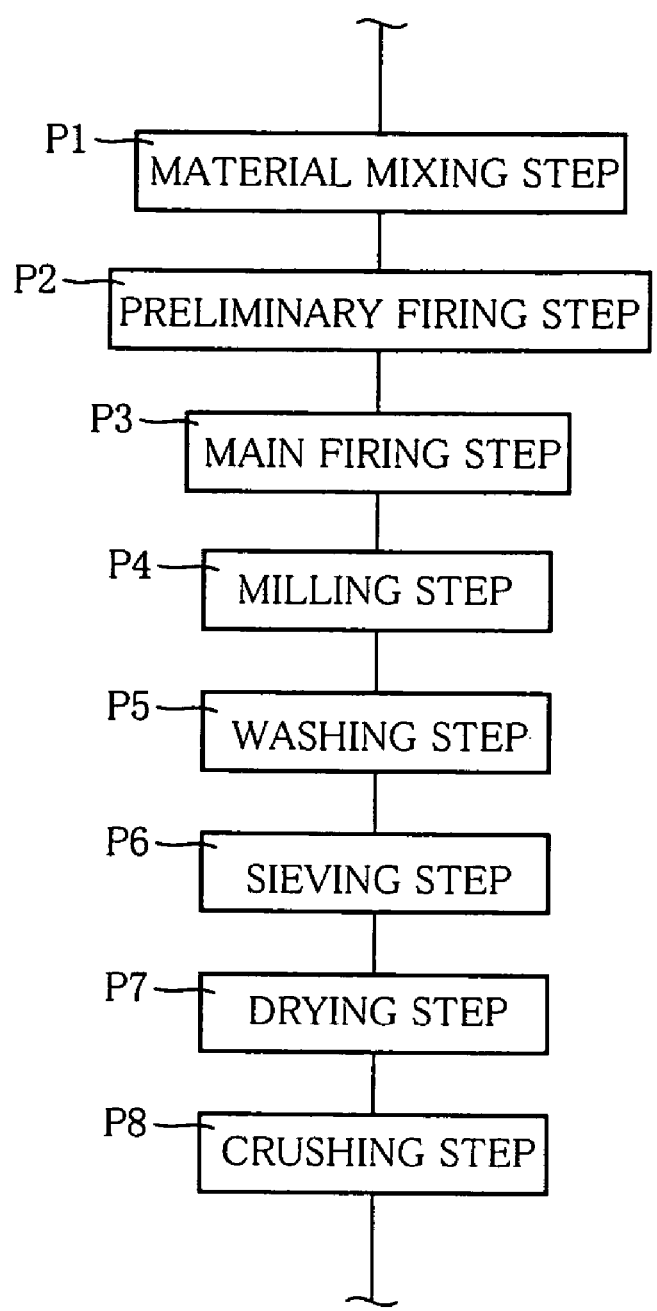
FIG. 1 is a flow chart showing a process of manufacturing a phosphor according to one embodiment of the invention.

There will be described in detail an embodiment of the present invention, with reference to the drawings. It is noted that elements which will be described are not necessarily accurately illustrated in the drawings, particularly in their configurations and relative dimensions.

Referring first to FIG. 1, there will be described a process of manufacturing a $Ca_{1-x}Sr_xTiO_3$:Pr, Zn, Li phosphor according to the embodiment of the invention. The process is initiated with a material mixing step P1 that is implemented to sufficiently mix suitable compounds as initial materials such as $CaCO_3$ (calcium carbonate), $SrCO_3$ (strontium carbonate), $TiO_2$ (titanium dioxide), $PrCl_3$ (praseodymium chloride), ZnS (zinc sulfide) and $Li_2CO_3$ (lithium carbonate), by wet vibration mixing, ball mill or mortar, for example. Before being mixed together, the compounds are weighed in accordance with a desired composition of the phosphor that is to be manufactured. A mixing proportion of the compounds are determined such that $0 \leq x \leq 1.0$, and such that an amount of Pr per one (mol) of the matrix, an amount of Zn per one (moD of the matrix and an mount of Li per one (mol) of the matrix are 0.01 (mol %), 3 (mol %) and 2 (mol %), respectively. A specific example of compositions is shown in Table 1 given below. In Table 1, a unit in each of columns other than a column of "x" is "g".

TABLE 1

| x | $CaCO_3$ | $SrCO_3$ | $TiO_2$ | $PrCl_3$ | ZnS | $Li_2CO_3$ |
|---|---|---|---|---|---|---|
| 0 | 73.62 | 0 | 58.75 | 0.0182 | 2.15 | 0.544 |
| 0.1 | 64.02 | 10.49 | 56.77 | 0.0176 | 2.08 | 0.525 |
| 0.2 | 55.04 | 20.30 | 54.91 | 0.0170 | 2.01 | 0.508 |
| 0.3 | 46.64 | 29.48 | 53.18 | 0.0165 | 1.95 | 0.492 |
| 0.4 | 38.75 | 38.10 | 51.54 | 0.0160 | 1.89 | 0.477 |
| 0.5 | 31.33 | 46.21 | 50.01 | 0.0155 | 1.83 | 0.423 |
| 0.6 | 24.34 | 53.85 | 48.56 | 0.0150 | 1.78 | 0.449 |
| 0.7 | 17.74 | 61.06 | 47.20 | 0.0146 | 1.73 | 0.437 |
| 0.8 | 11.51 | 67.88 | 45.91 | 0.0142 | 1.68 | 0.425 |
| 0.9 | 5.60 | 74.33 | 44.69 | 0.0138 | 1.64 | 0.413 |
| 1.0 | 0 | 80.45 | 43.53 | 0.0135 | 1.59 | 0.403 |

The material mixing step S1 is followed by a preliminary firing step P2 in which mixture (mixed materials) is first put into a crucible made of alumina with a purity of at least 99.5 (%) and is then subjected to a preliminary heat treatment that is carried out, for example, under a standard atmosphere at a maximum temperature of about 1100° C. in an electric furnace for about 3-10 hours, for example, 6 hours.

The preliminary firing step P2 is followed by a main firing step P3 in which the mixture having been subjected to the preliminary heat treatment is first put into a crucible made of alumina and is then subjected to a main heat treatment that is carried out, for example, under a standard atmosphere at a maximum temperature of about 1150-1200° C. (e.g., 1150 ° C.) for about 1-6 hours, for example, 3 hours. The heat treatment causes a chemical reaction indicated by the below-described formula (1), by which $Ca_{1-x}Pr_xTiO_3$:Pr,Zn,Li is composed from the initial materials. Then, a milling step P4 is implemented to mill or divide the composed phosphor into particles whose average diameter is about 3 (μm), for example, by using an alumina mortar.

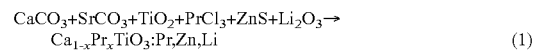

$$CaCO_3+SrCO_3+TiO_2+PrCl_3+ZnS+Li_2O_3 \rightarrow Ca_{1-x}Pr_xTiO_3:Pr,Zn,Li \qquad (1)$$

Next, in a washing step P5, the phosphor particles are dispersed into water, whereby water-soluble residual is dissolved. Among the initial materials, $PrCl_3$ is water-soluble while the composed phosphor and the other materials are not water-soluble, so that only unreacted $PrCl_3$ is dissolved in the water.

In a sieving step P6, the phosphor dispersed in the water is sieved with, e.g., a #300 sieve so as to remove large particles, and then the sieved dispersion is kept still for a suitable length of time so as to cause small particles of the phosphor to precipitate. After the suitable length of time, a supernatant liquid is removed by suction using, for example, a pipette. Thus, the water-soluble residual contained in the supernatant liquid (i.e., the water soluble component of the materials) is removed. The step P6 may be repeated a plurality of times, as needed, so as to remove completely the water-soluble residual. Next, in a drying step P7, the particles of the phosphor remaining after the removal of the supernatant liquid is dried at a temperature of, for example, about 120 (° C.) for about 5 hours. Subsequently, in a crushing step P8, the thus obtained aggregation of solids are crushed in an alumina mortar or the like, into powder. Thus, the powder of the $Ca_{1-x}Pr_xTiO_3$:Pr,Zn,Li phosphor is obtained.

Next, the results of evaluation of characteristics of the phosphor composed by the above-described process will be explained. Prior to the evaluation, the powder of phosphor is mixed with a suitable amount of powder of $In_2O_3$ (indium oxide) for the purpose of increasing an electric conductivity of the phosphor powder, and is further mixed with an organic binder and a vehicle such as an organic solvent, so as to prepare a paste of the phosphor. The amount of the powder of $In_2O_3$ mixed is suitably determined based on the electric conductivity of the phosphor powder per se and a required degree of electric conductivity of a layer formed of the phosphor. For example, about 5-15 (wt. %) (e.g., 6-8 (wt. %)) of the powder of $In_2O_3$ is mixed with 100 (wt. %) of the phosphor powder. The prepared paste of the phosphor is applied onto, for example, a display surface of a display device, so that a layer of the phosphor is formed with a suitable thickness. The evaluation was conducted to the thus formed phosphor layer. Specifically, a fluorescent display tube 10 having a construction shown in FIGS. 2-4 was evaluated.

Figure 2:
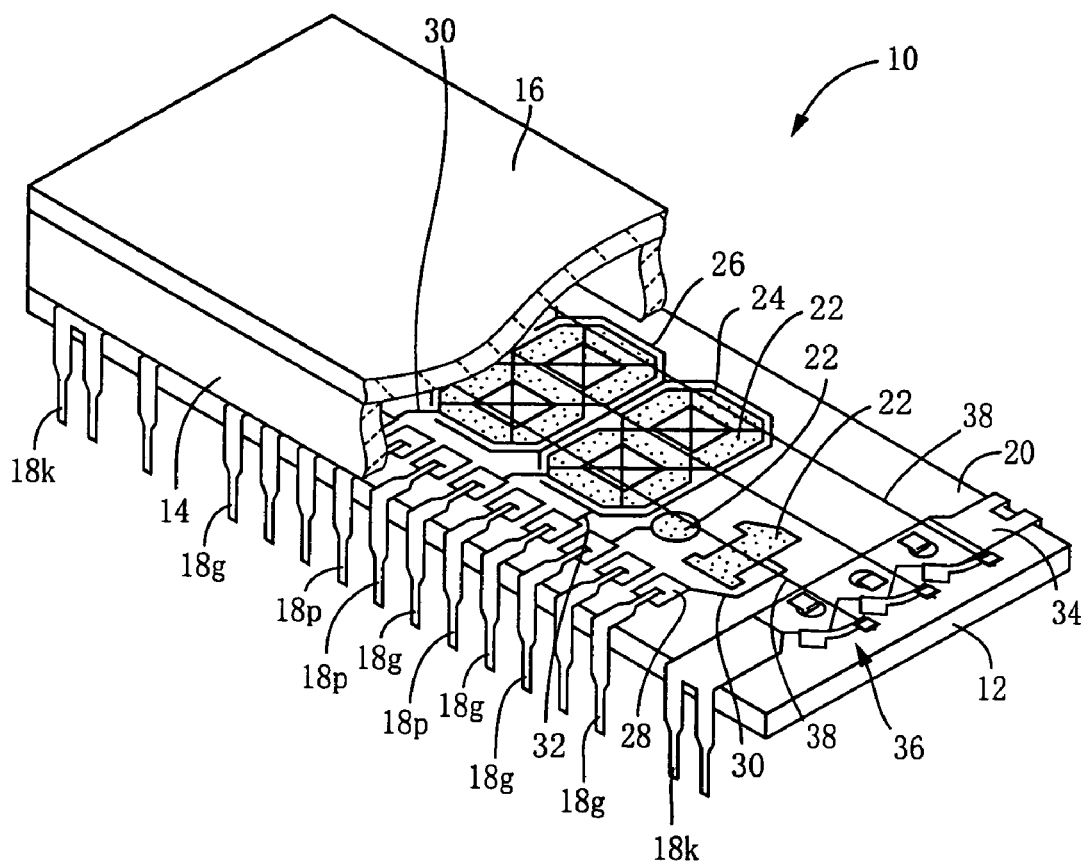
FIG. 2 is a perspective view showing an entire construction of a fluorescent display tube as an example of a fluorescent display device according to the invention, with its front plate being partially cut away.

FIG. 2 shows the fluorescent display tube 10 as an example of a fluorescent display device to which the present invention is also applied. In the figure, the fluorescent display tube 10 includes a base plate 12 provided with a phosphor layer 22; a frame-like spacer glass member 14; a transparent covering glass plate 16; a plurality of anode terminals 18p; a plurality of grid terminals 18g; and two cathode terminals 18k. The phosphor layer 22 is configured to have a predetermined pattern and is divided into a plurality of portions. The base plate 12 is made of an electrically insulating material such as glass, ceramic and porcelain enamel. The base plate 12 and the glass cover plate 16 are sealed with each other via the spacer glass member 14 so as to provide an elongate, flat, box-like, gas-tight container having a vacuum space therein.

The base substrate 12 has a display surface 20 on which the plurality of portions of the phosphor layer 22 are disposed. Each of the plurality of portions of the phosphor layer 22 is surrounded by a grid electrode 24 and an auxiliary grid electrode 26. The auxiliary grid electrode 26 is electrically insulated from the grid electrodes 24 and is common to all the portions of the phosphor layer 22. The grid electrodes 24 and the auxiliary grid electrode 26 are connected to the grid terminals 18g via grid wires 30, 32, respectively, provided on the display surface 20, and respective terminal pads 28 arranged along a long side of the surface 20.

On longitudinally opposite end portions of the base surface 12, there are fixed two terminal members 34 (only one terminal member 34 is shown in FIG. 2) each of which includes a corresponding one of the above-described two cathode terminals 18k and a fixed anchor 36 that cooperates with a support member (not shown) to support a plurality of thin filaments (filament cathode) 38 functioning as a directly heated cathode such that the thin filaments 38 are strung in parallel to a longitudinal direction of the base plate 12, at a predetermined height position spaced upward from the display surface 20, i.e., the phosphor layer 22. Each of the filaments 38 is constituted by, for example, a tungsten (W) wire whose surface is coated with an electron emitting layer in the form of a solid solution of an oxide of an alkaline earth metal (e.g. BaO, SrO, CaO) whose work function is low. The fluorescent display tube 10 is provided with a getter (not shown) that is for increasing the degree of vacuum of the inner space of the gas-tight container, and a gas exhausting tube or hole (not shown) that is for exhausting gas from the inner space of the container and hereby rendering the inner space vacuum.

Figure 3:
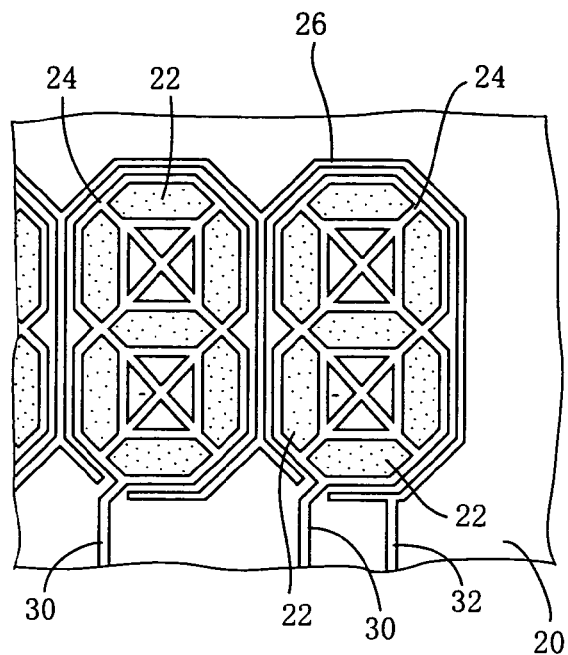
FIG. 3 is an enlarged plan view of a part of a display surface of the fluorescent display tube of FIG. 2, showing a fluorescent layer of the display surface.
Figure 4:
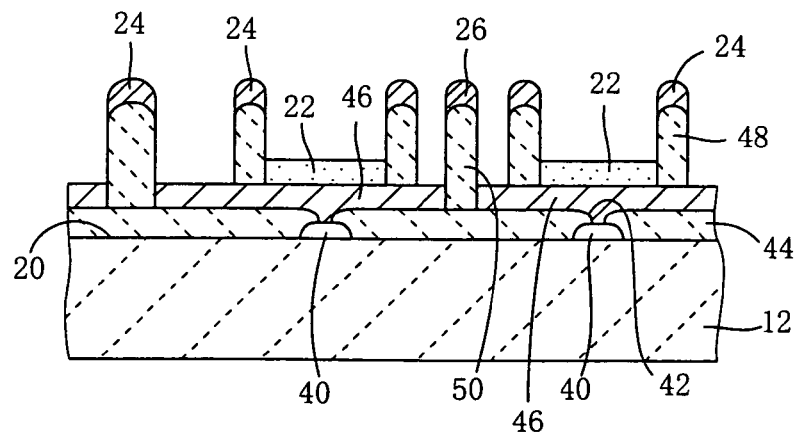
FIG. 4 is an enlarged cross sectional view of a part of the fluorescent display tube of FIG. 2.

FIG. 3 is an enlarged view showing a portion of the display surface 20, while FIG. 4 is an enlarged view showing a portion of the base plate 12. On the display surface 20, there are provided a plurality of anode wires 40 each of which is constituted by an electrically conductive thick film and is connected to a corresponding one of the anode terminals 18p. On the anode wires 40, there is fixed an electrically insulating layer 44 which is constituted by a glass thick film and which has a plurality of through-holes 42 in respective portions. On the insulating layer 44, there are provided a plurality of anodes 46 each of which is constituted by a graphite sheet whose size is somewhat larger than a corresponding one of the fluorescent patterns of the phosphor layer 22. The anodes 46 are electrically connected to the respective anode wires 40 via the respective through-holes 42 of the insulating layer 44. On the anodes 46, there is formed the phosphor layer 22. Each of the portions of the phosphor layer 22 is surrounded by rib-like walls 48, 50 each of which is constituted, for example, by a glass thick film. Each of the above-described grid electrodes 24 and auxiliary grid electrode 26 is constituted, for example, by an electrically conductive thick film, and is provided on the top of a corresponding one of the rib-like walls 48, 50.

In the fluorescent display tube 10 constructed as described above, thermoelectrons emitted by the filament cathode 38 at 0 V are accelerated by the grid electrodes 24 to which a positive voltage of, for example, about 20 (V) is applied. Therefore, in a case where the accelerating voltage is sequentially applied to the grid electrodes 24, i.e., "scans" the same 24 and concurrently a positive voltage is selectively applied to the respective anode wires 40 connected to selected ones of the portions of the phosphor layer 22, in synchronization with the scanning of the grid electrodes 24, the thermoelectrons collide with the selected portions of the phosphor layer 22 so that those selected portions are caused to emit light. If the anode wires 40 to which the positive voltage is selectively applied are changed each time the grid electrodes 24 are scanned, desired fluorescent display images can be continuously obtained. However, the evaluation of the phosphor was carried out under a condition that the positive voltage is constantly applied to the portions of the phosphor layer 22 and accordingly the portions of the phosphor layer 22 are caused to continuously emit light, a brightness of the light is measured.

Figure 5:
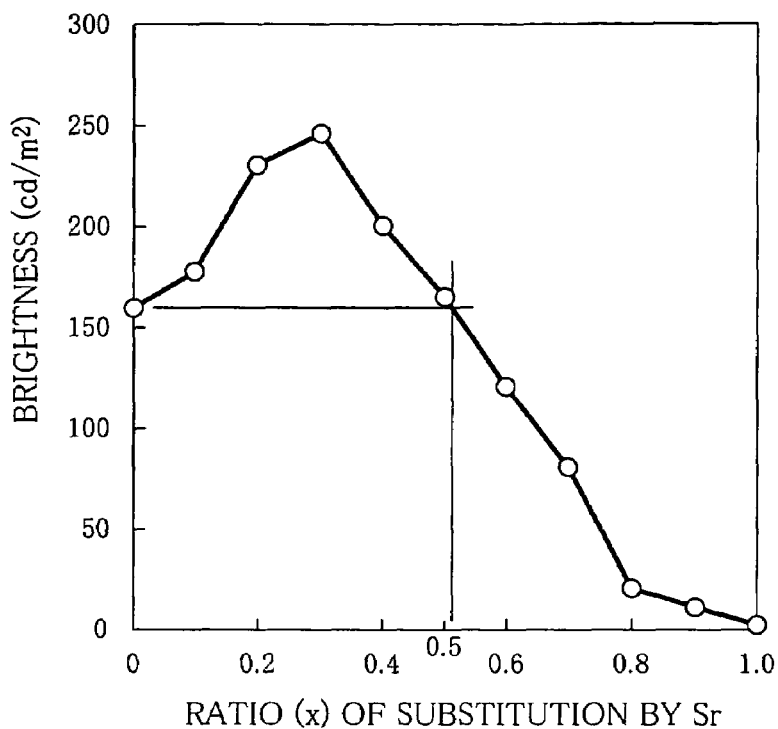
FIG. 5 is a graph showing a relationship between a brightness of the phosphor and a ratio (x) of substitution by Sr in a matrix of the phosphor.

FIG. 5 shows a result of evaluation regarding a relationship between the brightness and a ratio (x) of substitution by Sr in the compositions shown in the above-described Table 1. As is apparent from a graph of FIG. 5, the brightness is higher where the ratio (x) is higher than 0 and not higher than 0.5 ($0<x\leq0.5$), than where the ratio (x) is equal to 0 (namely, no substitution by Sr). Further, in a sample having a composition expressed by $Ca_{0.8}Sr_{0.2}TiO_3$: Pr, Zn, Li (namely, the ratio (x) of substitution by Sr is 0.2), a so-called "half life time" was measured. The half life time is a length of time that is required to cause the brightness to be lowered to half as high as its initial value of the brightness. According to the measurement, the half life time of the $Ca_{0.8}Sr_{0.2}TiO_3$: Pr, Zn, Li was about 1000 hours. Thus, the result of the measurement revealed that the half life time of the $Ca_{0.8}Sr_{0.2}TiO_3$: Pr, Zn, Li phosphor is sufficiently longer than the half life time of the $SrTiO_3$:Pr,Al phosphor, which is shorter than 100 hours.

Further, in the evaluation, it was confirmed that the brightness was maximized where the ratio (x) was 0.3 (x=0.3), and that the brightness was abruptly lowered where the ratio (x) exceeds 0.3. That is, the result of the evaluation also revealed that the appropriate value of the ratio (x) is about 0.3 in the composition in which 0.01 (mol %) of Pr, 3 (mol %) of Zn and 2 (mol %) of Li are added per one (mol) of the matrix. Although the evaluation was made only to the case of the above-described additive amounts of Pr, Zn and Li, it is considered that any change of the additive amounts of Pr, Zn and Li does not cause change of the tendency in which the brightness is maximized where the ratio (x) is about 0.3.

Figure 6:
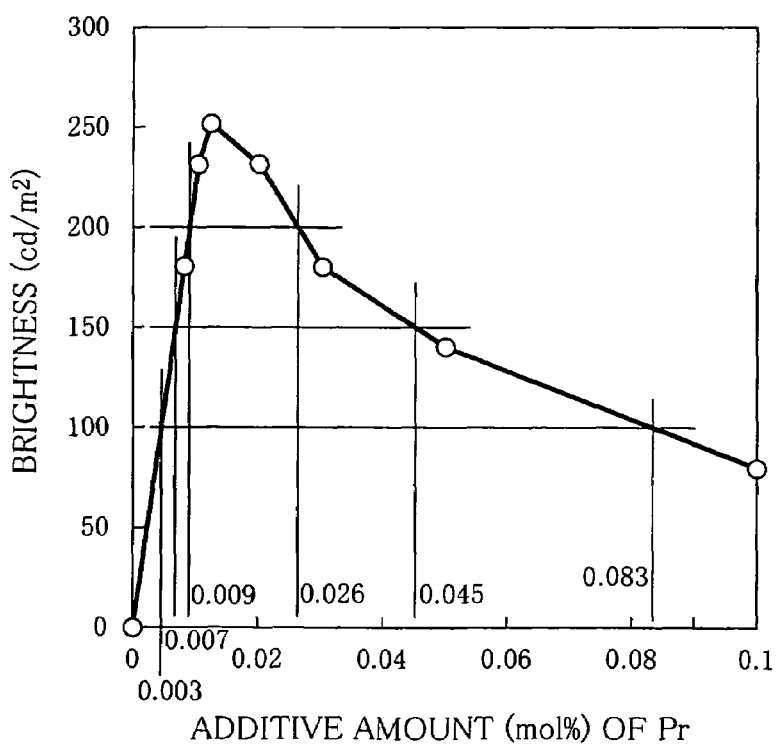
FIG. 6 is a graph showing a relationship between the brightness of the phosphor and an amount of Pr added to the matrix of the phosphor.

FIG. 6 shows a result of evaluation regarding a relationship between the brightness and the additive amount (mol %) of Pr in the composition of $Ca_{0.8}Sr_{0.2}TiO_3$: Pr, Zn, Li (namely, the ratio (x) of substitution by Sr is 0.2). The evaluation was made by changing the additive amount of Pr from 0.008 to 0.1 (mol %) while fixing the additive amounts of Zn and Li in 3 (mol %) and 2 (mol %), respectively. As is apparent from a graph of FIG. 6, the brightness was higher than 100 ($cd/m^2$) where the additive amount of Pr was in a range of about 0.003-0.09 (mol %). The brightness was in a preferable range that was not lower than 150 ($cd/m^2$) where the additive amount of Pr was in a range of about 0.007-0.05 (mol %). The brightness was in a further preferable range that was not lower than 200 ($cd/m^2$) where the additive amount of Pr was in a range of about 0.009-0.03 (mol %). The brightness was maximized where the additive amount of Pr was about 0.012 (mol %). Where the additive amount of Pr exceeds 0.012 (mol %), the brightness was gradually lowered with increase of the additive amount of Pr.

Figure 7:
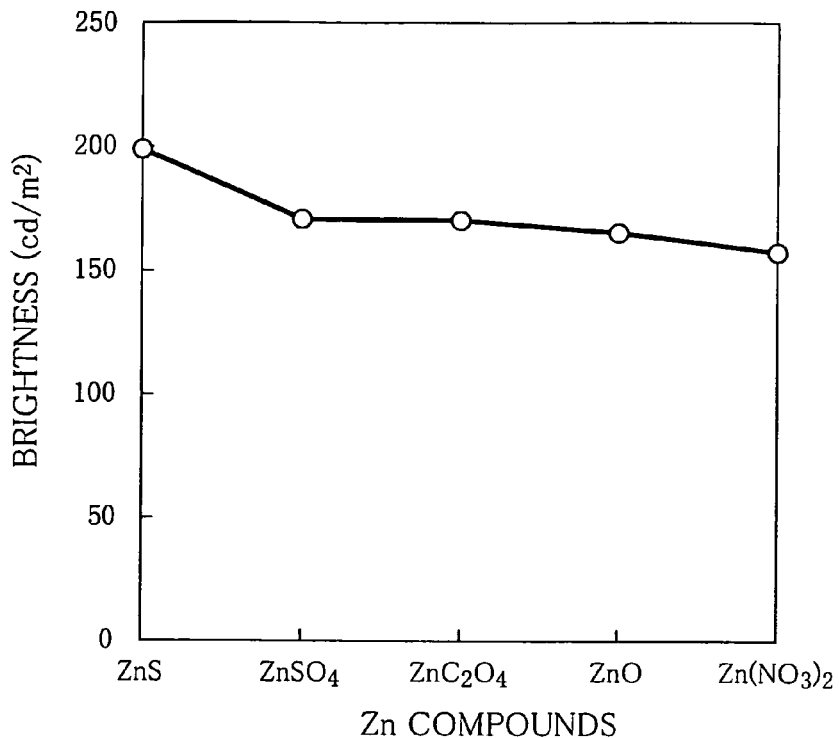
FIG. 7 is a graph showing a relationship between the brightness of the phosphor and a kind of Zn compound added as Zn source to the matrix of the phosphor.

FIG. 7 shows a result of evaluation regarding a relationship between the brightness and a kind of Zn compound added as Zn source to the composition of $Ca_{0.8}Sr_{0.2}TiO_3$: Pr, Zn, Li in which the additive amounts of Pr, Zn and Li were 0.01 (mol %), 3 (mol %) and 2 (mol %), respectively. The evaluation was made in each of cases where the Zn compound was provided by ZnS, $ZnSO_4.7H_2O$, $ZnC_2O_4.2H_2O$, ZnO are $Zn(NO_3)_2.6H_2O$. As is apparent from a graph of FIG. 7, the brightness was maximized where the Zn compound was provided by ZnS. Since the brightness was not lower than 150 ($cd/m^2$) also where the Zn compound was provided by each of the compounds other than ZnS, all of the above-described compounds were useful. However, among the above-described compounds, $ZnSO_4$ and $Zn(NO_3)_2$ are not easy to handle due to their hygroscopicity, and ZnO is hard to handle due to its high degree of sintering. In view of such a difficulty found in the other compounds, too, ZnS is the most preferable material.

Figure 8:
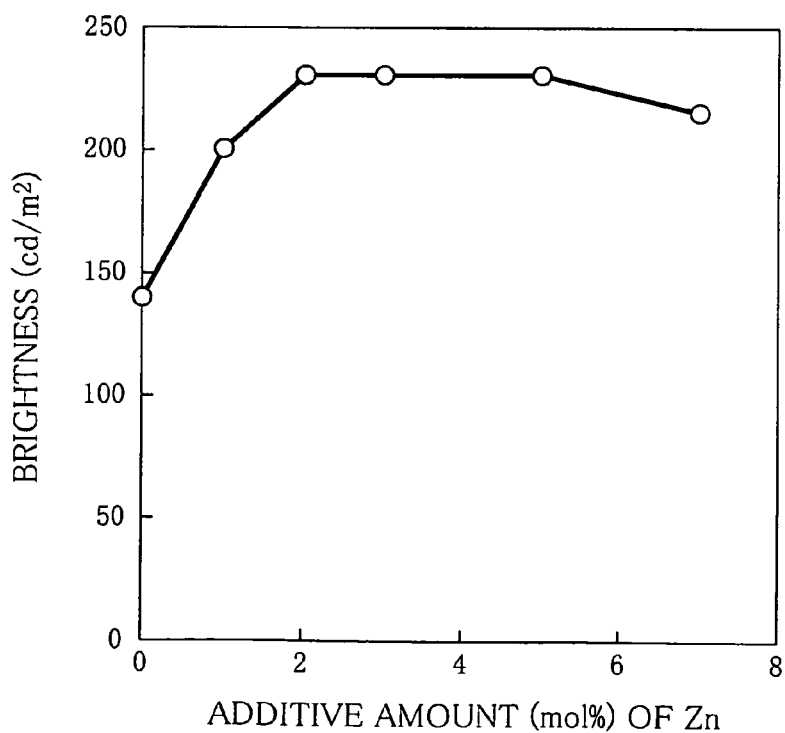
FIG. 8 is a graph showing a relationship between the brightness of the phosphor and an amount of Zn added to the matrix of the phosphor.

FIG. 8 shows a result of evaluation regarding a relationship between the brightness and the additive amount (mol %) of Zn where the Zn compound was provided by ZnS. As is apparent from a graph of FIG. 8, although the brightness was as high as to be close to 150 ($cd/m^2$) even in absence of Zn, the brightness could be maximized to about 230 ($cd/m^2$) in presence of Zn. That is, the evaluation revealed that the addition of Zn is preferable to obtain a further high degree of brightness.

As is clear from the above description, in the $Ca_{1-x}Sr_xTiO_3$: Pr,Li phosphor according to the invention, at least Pr and Li are added to the $Ca_{1-x}Sr_xTiO_3$ matrix in which a part of the A site of $CaTiO_3$ is substituted by Sr within a range of $0<x\leq0.5$.

The thus constructed phosphor as the oxide-based phosphor has a service life longer than that of $SrTiO_3$:Pr,Al phosphor and is capable of emitting a light with a high brightness even by excitation thereof with a low-velocity electron beam.

While the embodiment of the present invention has been described above for illustrative purpose only, it is to be understood that the present invention may be embodied with various changes and improvements, which may occur to those skilled in the art, without departing from the sprit of the invention.

What is claimed is:

1. A phosphor comprising:
   a matrix in the form of titanate expressed by $Ca_{1-x}Sr_xTiO_3$ ($0<x\leq0.5$); and
   Pr (praseodymium) and Li (lithium) that are added to said matrix.

2. The phosphor according to claim 1, wherein said Pr is added in an amount of from 0.003 to 0.09 (mol %).

3. The phosphor according to claim 1, wherein said Li is added in an amount of 3 (mol %) or less.

4. A phosphor comprising:
   a matrix in the form of titanate expressed by $Ca_{1-x}Sr_xTiO_3$ ($0<x\leq0.5$); and
   Pr (praseodymium), Li (lithium) and Zn (zinc) that are added to said matrix.

5. The phosphor according to claim 2, wherein said Pr is added in an amount of from 0.003 to 0.09 (mol %).

6. The phosphor according to claim 2, wherein said Li is added in an amount of 3 (mol %) or less.

7. A display device comprising a light emitting source that is provided by the phosphor defined in claim 1.

8. A display device comprising a light emitting source that is provided by the phosphor defined in claim 4.

9. A process of manufacturing the phosphor defined in claim 1, comprising:
   a mixing step of mixing a matrix material forming said matrix, a first additive material including Pr, and a second additive material including Li, so as to obtain a mixture; and
   a firing step of firing the obtained mixture at a firing temperature of from 1050 to 1250° C.

10. The process according to claim 9, further comprising:
    a preliminary firing step that is implemented before said firing step as a main firing step, to fire said obtained mixture at a preliminary firing temperature of from 800 to 1200° C., so as to obtain a preliminarily fired mixture, wherein said main firing step is implemented to fire said preliminarily fired mixture.

11. A process of manufacturing the phosphor defined in claim 4, comprising:
    a mixing step of mixing a matrix material forming said matrix, a first additive material including Pr, a second additive material including Li and a third additive material including Zn, so as to obtain a mixture; and
    a firing step of firing the obtained mixture at a firing temperature of from 1050 to 1250° C.

12. The process according to claim 11, further comprising:
    a preliminary firing step that is implemented before said firing step as a main firing step, to fire said obtained mixture at a preliminary firing temperature of from 800 to 1200° C., so as to obtain a preliminarily fired mixture, wherein said main firing step is implemented to fire said preliminarily fired mixture.

* * * * *